Figure 1:
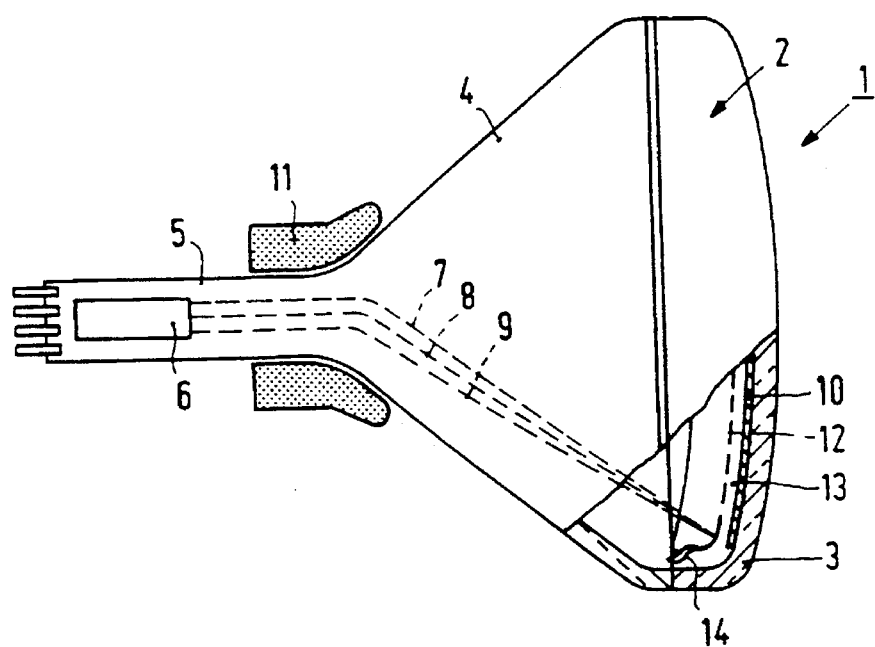

United States Patent [19]

Vrijssen

[11] Patent Number: 5,621,273
[45] Date of Patent: Apr. 15, 1997

[54] CATHODE RAY TUBE AND METHOD OF MANUFACTURING A CATHODE RAY TUBE

[75] Inventor: Gerardus A. H. M. Vrijssen, Eindhoven, Netherlands

[73] Assignee: U.S. Philips Corporation, New York, N.Y.

[21] Appl. No.: 445,255

[22] Filed: May 19, 1995

Related U.S. Application Data

[63] Continuation of Ser. No. 977,426, filed as PCT/NL92/00127, Jul. 13, 1992, abandoned.

[30] Foreign Application Priority Data

Jul. 15, 1991 [NL] Netherlands ............. 9101241

[51] Int. Cl.⁶ ..................................... H01J 29/88
[52] U.S. Cl. ............................. 313/479; 427/64
[58] Field of Search .................. 313/479; 427/64

[56] References Cited

U.S. PATENT DOCUMENTS 4,473,774  9/1984  Hernqvist ..................... 313/479

FOREIGN PATENT DOCUMENTS 2650438  7/1989  France .

Primary Examiner—Sandra L. O'Shea
Assistant Examiner—Matthew J. Esserman
Attorney, Agent, or Firm—Arthur G. Schair

[57] ABSTRACT

Electrically insulating surfaces of a cathode ray tube are covered with a film of an organic material (211). This improves the high-voltage behavior of the cathode ray tube. The film is applied by a method in which a solution comprising an organic material is applied, which is allowed to dry and is subsequently caused to decompose partly.

33 Claims, 3 Drawing Sheets

CATHODE RAY TUBE AND METHOD OF MANUFACTURING A CATHODE RAY TUBE

This is a continuation of application Ser. No. 07/977,426, filed as PCT/NL92/00127, Jul. 13, 1992, now abandoned.

BACKGROUND OF THE INVENTION

The invention relates to a cathode ray tube comprising an electron gun, in which an electrically insulating surface is covered with an electrically insulating film.

Such a cathode ray tube is known from U.S. Pat. No. 4,473,774.

In operation, one or more electron beams are generated in cathode ray tubes. Cathode ray tubes are used in, inter alia, television receivers, electron microscopes, oscilloscopes, X-ray detectors, image intensifiers, photomultipliers, ion-implantation apparatuses and other devices. Within the framework of the invention the term electron gun is to be understood to mean a means of generating electrons. The electrons may be generated in the form of an electron beam.

A problem which occurs in cathode ray tubes is that, in operation, surfaces inside the cathode ray tube are charged. Such charging phenomena occur, in particular, on electrically insulating surfaces. As a result thereof, negative effects may occur. For example, flashover between components of the cathode ray tube ("arcing") and undesirable light effects ("blue glow") may occur. These effects are also referred to herein as the high-voltage behaviour of the cathode ray tube. U.S. Pat. No. 4,473,774 discloses a cathode ray tube having an electron gun arranged in the neck. The inner side of the neck is covered with a film of a non-ionic organic copolymer. The cathode ray tube disclosed in U.S. Pat. No. 4,473,774 should comply with the following requirements:
1. The copolymer used does not degrade at the temperatures which are customary during the manufacture of a cathode ray tube, i.e. the film should inter alia be heat resistant.
2. Steps must be taken to prevent the film from becoming detached.
3. The applied film cannot withstand RF spot-knocking (RFSK), which is a frequently used method in the manufacture of cathode ray tubes.
4. Care must be taken that the film does not become overheated during manufacture of the cathode ray tube.

As a result of the above-mentioned drawbacks the cathode ray tube as described in U.S. Pat. No. 4,473,774 is not suited for mass production. Only very few materials are suitable and the manufacturing method should comply with very stringent requirements.

SUMMARY OF THE INVENTION

It is an object of the invention to provide a cathode ray tube of the type defined in the opening paragraph, which wholly or at least partly solves one or more of the above-mentioned problems.

In accordance with a first aspect of the invention a cathode ray tube of the type defined in the opening paragraph is characterised in that the film is a degradation product of a layer of an organic material.

In the context of the invention a degradation product is to be understood to mean a film which is a residue of a layer of an organic material which has been subjected to a treatment in which the originally deposited layer of organic material decomposes partly, leaving a residual film.

A residual film of a material which decomposes partly at the high temperatures and the conditions customary during the manufacture of a cathode ray tube is found to improve the high-voltage behaviour in spite of the fact that the originally applied layer has partly decomposed.

The recognition of this fact makes it possible to employ materials which partly decompose when subjected to temperatures and conditions customary during manufacture. This class of materials includes, for example, nitrocellulose, polyacrylates, acrylic resins, polyvinyl compounds such as polyvinyl acrylates, polyvinyl acetates and polyvinyl alcohols, fats and organic soaps. All these materials are subjected to a partial thermal decomposition at temperatures as customary during manufacture of a cathode ray tube. Nevertheless, the residual films left after partial decomposition are found to be useful.

In general, steps to preclude overheating of the film, as described in U.S. Pat. No. 4,473,774, are therefore not necessary. Moreover, a partial decomposition of the film has a positive effect on the high-voltage behaviour of the cathode ray tube.

Thus, less requirements are imposed on the materials used and on the temperature control, which renders the cathode ray tube better suitable for mass production.

In accordance with a second aspect of the invention a cathode ray tube of the type defined in the opening paragraph is characterised in that the film is a film of an organic material and the thickness of the film is less than 1 micron.

Within the scope of the invention a film of organic material is to be understood to mean a film which consists at least predominantly of an organic compound or a mixture of organic compounds. Such a film will hereinafter also be referred to as "organic film".

If the thickness of the film is less than 1 micron the film generally adheres well to the insulating surface. Therefore, means and process steps to ensure that the layer adheres to the insulating surface may be dispensed with. This allows the method of applying the film to be simplified.

Moreover, a film thinner than 1 micron is found to be capable of withstanding spot-knocking. Therefore, it is not necessary to abandon a customary process step.

As a result, the cathode ray tube is better suitable for mass production.

Preferably, the two above-mentioned aspects are combined.

Generally, the conductivity of the film changes during and as a result of the partial decomposition of the applied layer. The sheet resistance of the film decreases. This has also a negative effect on the adhesion of the film to the surface. As regards these aspects a film thinner than 1 micron may generally be subjected to a more extensive and longer decomposition than a layer thicker than 1 micron. This reduces the likelihood of rejects.

Preferably, the thickness of the film is between approximately 500 nm and approximately 10 nm.

If the film is thinner than 10 nm it is not unlikely that the underlying insulating surface is not wholly covered. This will give rise to high-voltage problems at the non-covered parts of the insulating surface.

Preferably, the coefficient of secondary electron emission, as a function of the kinetic energy of the electrons exhibits a second crossover ($E_{1f}$) for an energy lower than approximately 1 keV.

It has been found that in general the value of the second crossover ($E_{1f}$) for the residual film is significantly smaller than the value of the second crossover of the originally deposited layer, which improves the high-voltage behaviour. This is particularly favourable if the originally deposited layer is of a material having a second crossover value above 1 keV. Examples of materials having a second crossover above 1 keV are acrylic resins, organic soaps and polyvinyl acetates. For this aspect it is also favourable if the thickness of the film is smaller than 1 micron because this enables a more extensive decomposition and hence a substantial reduction of the second crossover ($E_{1f}$) to be obtained.

For cathode ray tubes having an electron gun in a tube neck of an electrically insulating material a film is preferably provided at least on the inner side of the tube neck. The electric potential at the tube neck is then very stable. No or very little flashover and drift take place. Drift is an effect characterised by a slow change in the place and/or shape of an electron beam generated by the electron gun.

In particular when the film is applied to a curved surface, for example the inner side of the tube neck, it is advantageous if the thickness of the film is less than 1 micron. As a result of the curvature of the inner side of the tube neck the film tends to come off the surface comparatively easily.

In the case of cathode ray tubes comprising an electron gun having elements of an electrically insulating material these elements are preferably covered with a film of an organic material.

Examples of such elements are the fixing elements such as the so-called multiform rods. Multiform rods are glass rods in which electrodes of a gun are secured. If these multiform rods have been covered with an organic film flashover between the multiform rods and components of the electron gun, and drift caused by charging the multiform rods occurs hardly ever or not at all.

For cathode ray tubes having electrodes constituting a main lens preferably at least one of these electrodes is subjected to an etching process.

Preferably, the above mentioned film has a high carbon content.

The invention also relates to a method of manufacturing a cathode ray tube and is characterized in that in a process step an internal surface of an element of the cathode ray tube is moistened with a solution of an organic substance and is subsequently dried, the layer thus formed being decomposed at least partly.

In this manner the organic film can be applied simply. The thickness of the organic film can be readily controlled via the amount of organic substance in the solution. In the scope of the invention the term "internal surface of an element of the cathode ray tube" is to be understood to mean a surface of an element situated in the interior of the assembled cathode ray tube. Moistening and drying the surface can take place before the cathode ray tube is assembled, for example on separate elements.

Preferably, the layer is decomposed at least partly by subjecting it to a thermal treatment. This treatment can be carried out during drying or while the cathode ray tube is being annealed. Preferably, the thermal treatment is carried out in a vacuum.

Alternatively, an electron bombardment can be used to at least partly decompose the organic film. Decomposition of the film leads to an increase of the carbon content of the film relative to the other constituents of the film, which generally leads to a reduction of the value for the second crossover ($E_{1f}$), which has a positive effect on the high-voltage behaviour.

BRIEF DESCRIPTION OF THE DRAWING FIGURES

Figure 3:
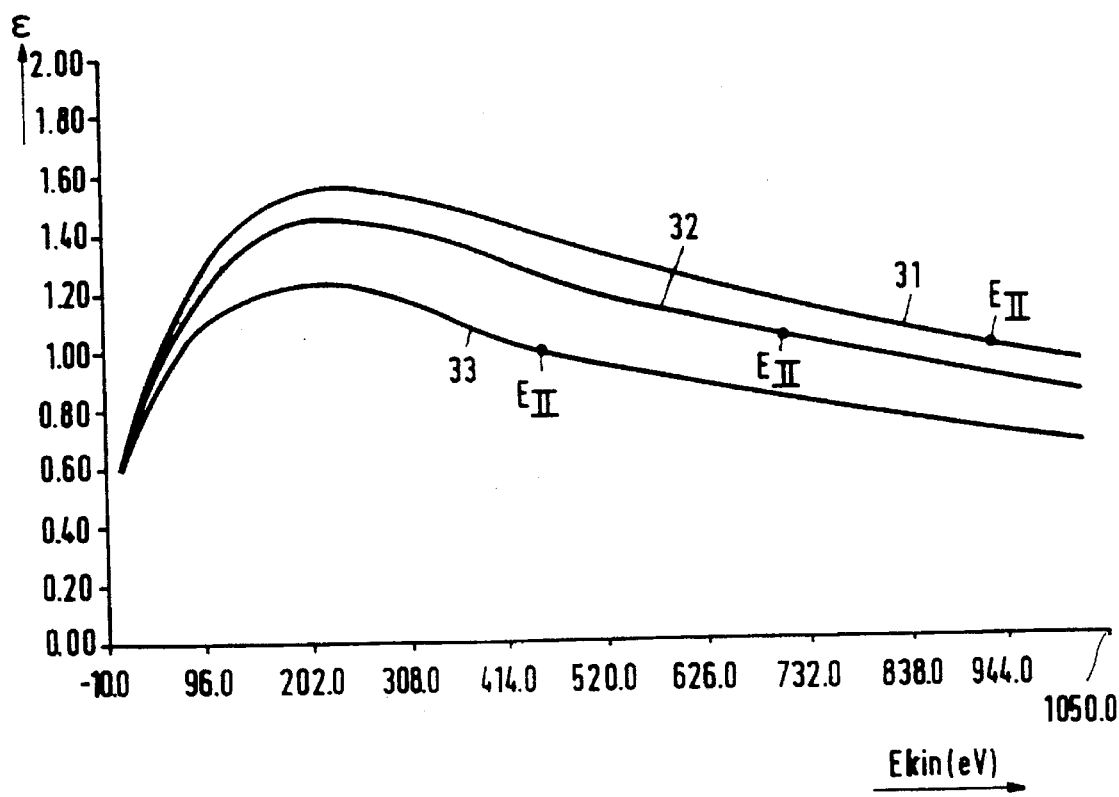
Figure 2:
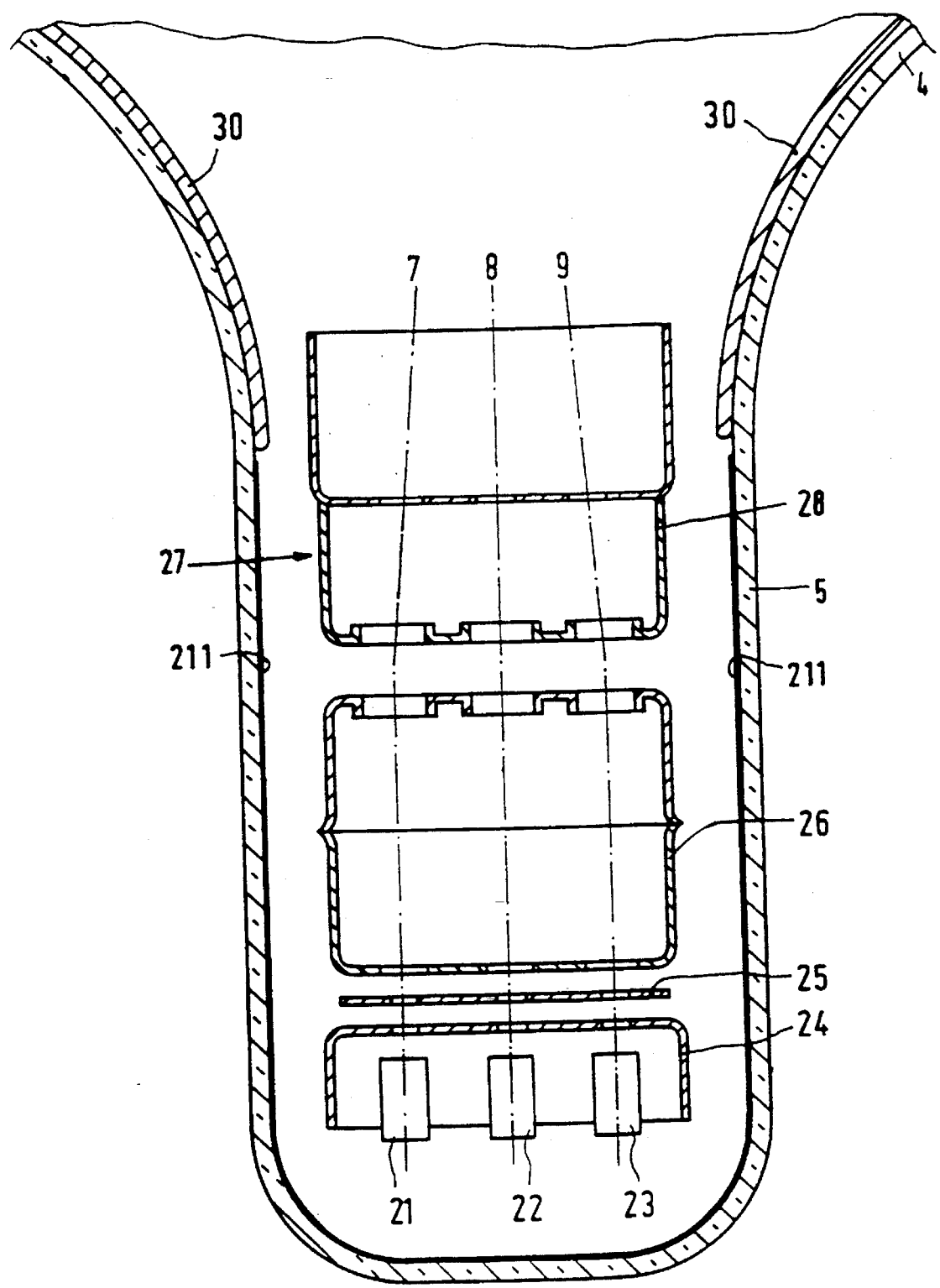
Figure 4A:
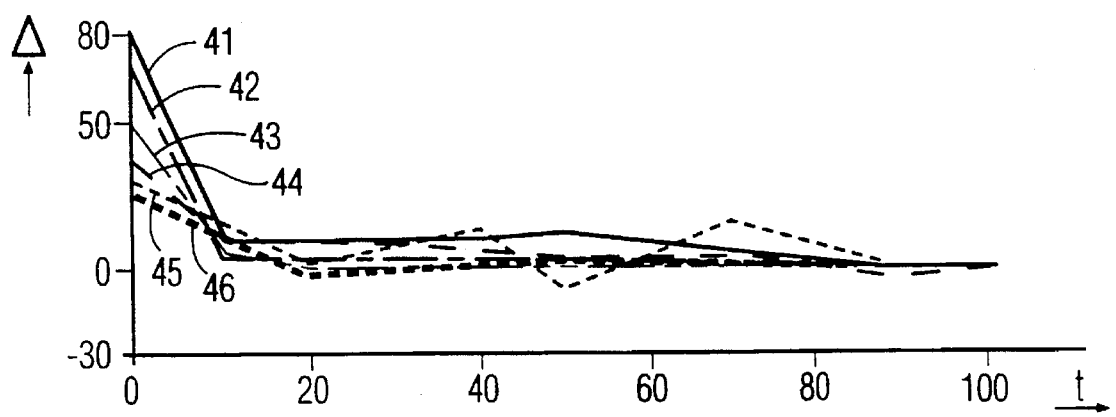
Figure 4B:
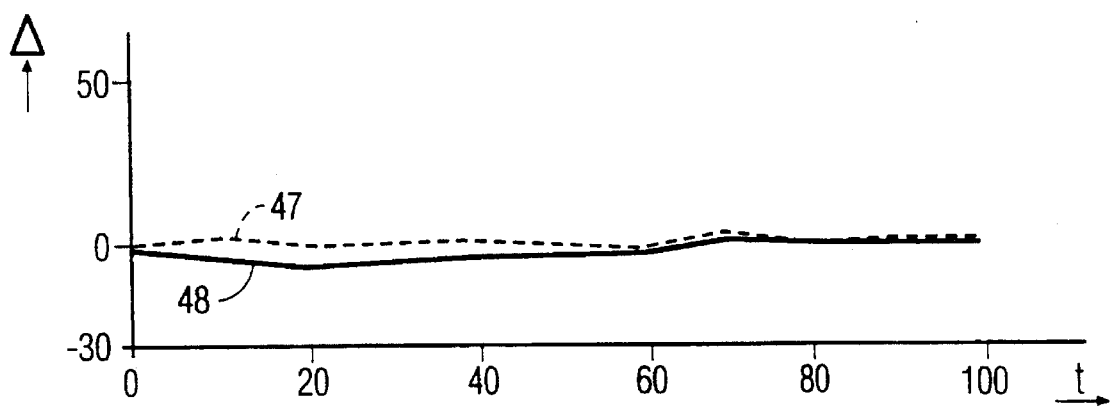

The invention will now be described in greater detail by means of an exemplary embodiment of the inventive display device and with reference to the accompanying drawings. In the drawings FIG. 1 is a longitudinal sectional view of a display device in accordance with the invention, FIG. 2 is a sectional view of a neck portion of a cathode ray tube in accordance with the invention, FIG. 3 shows, as a function of the kinetic energy of an incident electron $E_{kin}$, the coefficient of secondary electron emission $\epsilon$ for a nitrocellulose film (curve 31) after heating in a vacuum (curve 32) and after electron bombardment (curve 33);

FIGS. 4a and 4b illustrate a further positive effect of an organic film.

The Figures are not drawn to scale. In general, corresponding parts bear the same reference numerals in the Figures.

DESCRIPTION OF THE INVENTION

FIG. 1 is a longitudinal cross-sectional view of a display device according to the invention. The display device comprises a cathode ray tube, in this example a colour display tube 1. The colour display tube comprises an evacuated envelope 2 which consists of a display window 3, a cone portion 4 and a neck 5. In the neck 5 there is provided an electron gun 6 for generating three electron beams 7, 8 and 9 which extend in one plane, the in-line plane which in this case is the plane of the drawing. A display screen 10 is provided on the inside of the display window. The display screen 10 comprises a large number of phosphor elements luminescing in red, green and blue. On their way to the display screen 10, the electron beams 7, 8 and 9 are deflected across the display screen by means of deflection unit 11 and pass through a colour selection electrode 12 which is arranged in front of the display window 3 and which comprises a thin plate with apertures 13. The colour selection electrode is suspended in the display window by means of suspension means 14. The three electron beams 7, 8 and 9 pass through the apertures 13 of the colour selection electrode at a small angle with each other and, consequently, each electron beam impinges on phosphor elements of only one colour.

The electron gun is arranged in the neck portion (FIG. 2). In this example, the electron gun comprises cathodes 21, 22 and 23 and a number of electrodes 24, 25, 26 and 27; a main lens being formed between the electrodes 26 and portion 28 of electrode 27. A conductive layer 30 is provided on the cone portion 4. A film 211 of an organic material is applied to the inner side of the neck portion 5. It has been found that such a film substantially improves the high-voltage behaviour of the cathode ray tube. In operation, a poor high-voltage behaviour manifests itself through the undesired lighting up of the screen and/or breakdowns in the tube and/or through the appearance of one or more patches of a blue glimmer on the inner wall of the tube and/or along the multiform rods. The invention is based on, inter alia, the insight that these phenomena can probably also be attributed to electron transport along electrically insulating surfaces. Electrons "hopping" across the tube wall may cause the glimmers of light either by ionization of residual gas in the tube or by luminescence of the glass. Electrons hopping across electrically insulating surfaces are formed if the surfaces have a high coefficient of secondary emission. When electrons (for example electrons formed by field emission) are incident on these surfaces an ever increasing number of electrons will "hop" across the electrically insulating surfaces under the influence of an electric field, towards the highest potential. These hopping electrons cause cold emission, charging of the neck and multiforms, and breakdowns in the tube. In addition, if the cathode ray tube comprises a display screen, the display screen may light up a little, which results in a reduction of the contrast. A further voltage increase leads to greater high-voltage problems. Flashover may damage the electron gun and it may adversely affect the operation of electronic circuits. The phenomena are substantially suppressed by the application of an organic film to insulating surfaces. The application of an organic film does not only lead to a reduction of the above technical problems but it also reduces the number of rejects because a substantial percentage of the rejects in the manufacture of cathode ray tubes may be attributed to high-voltage problems. Thus, one of the advantages of the present invention is that it allows higher voltages to be used. The light output can be increased by raising the kinetic energy of the electrons. This is important, in particular, for projection-cathode ray tubes, cathode ray tubes for HDTV applications etc. Such tubes preferably have a very high light output. The present invention enables these advantages to be obtained.

In a test tube the inner side of the neck and the multiform rods are moistened with a solution of nitrocellulose $(C_6H_7O_{11}N_3)_n$ in ethyl acetate or amyl acetate, for example a 1% solution of nitrocellulose in ethyl acetate. After drying a layer of nitrocellulose remains. Subsequently, this layer is preferably heated, in a vacuum, as a result of which the layer at least partly decomposes, causing the carbon content in the layer to increase relative to the other constituents (for example oxygen or nitrogen) in the layer. For example, a temperature treatment in which the film is heated to approximately 350° C. in a vacuum for approximately 15 minutes reduces the molar percentage of oxygen present in the layer to approximately ⅓ to ⅕ of the molar percentage of oxygen present before the thermal treatment in a vacuum, and it reduces the percentage of nitrogen to approximately half the molar percentage of nitrogen present in the film before the thermal treatment in a vacuum. An analysis by means of XPS measurements and IR spectra further reveals that such a film is partly carbonised as a result of the partial thermal decomposition, i.e. carbon bound by four single bonds and carbon bound by two single bonds and a double bond is formed in the film. The film has been found to contain approximately (in atomic percentages) 50% (±5%) of C, approximately 15% (±3%) of O, approximately 30% (±3%) of H, and approximately 3% (±2% ) of N.

A further advantage of a temperature treatment resides in the fact that the composition of the film does not change or changes very little in operation, whereas the composition of a film which is not subjected to a temperature treatment or other type of decomposition treatment (for example electron bombardment and/or sputtering with argon gas, which treatments can also cause a partial decomposition of the layer) may change in operation. In general, the resistance of the film changes as a result of the decomposition. The resistance generally decreases. The thickness of the film is generally less than 1 micron. For a film having a thickness of approximately 20 nm the sheet resistance, after partial decomposition, exhibits a comparatively large spread, depending on the degree of decomposition, and lies in the range between approximately $10^{14}$ and approximately $10^{11}$ Ω/□. The sheet resistance is approximately 50 times as small for layers having a thickness of more than 1 micron. If the sheet resistance is less than approximately $10^{10}$ Ω/□ the likelihood of high-voltage problems increases considerably. The likelihood of the sheet resistance being too low for a layer thicker than 1 micron is comparatively great.

Even at a very high voltage (higher than 40 kV to for example approximately 50 kV) the test tube exhibited no cold emission and no flashover. A comparable tube which was not provided with a film of an organic material exhibited the above problems at voltages of approximately 25 to 30 kV. The term "voltage" is to be understood to mean herein the electric potential difference between the cathode and the final electrode of the electron gun. The electrons emitted by the electron gun have a kinetic energy of x keV if the "voltage" is x kV.

Moistening can be carried out, for example, by spraying the solution onto the surfaces or by applying it with a brush or by immersing the relevant parts in the solution or by applying the solution to the inner side of the neck by means of a brush or rollers.

In the scope of the invention the coefficient of secondary electron emission of organic films on insulating surfaces has been examined. Methods of measuring coefficients of secondary electron emission have been described inter alia by V. E. Henrich in "Fast, Accurate Secondary-Electron Yield Measurements at Low primary Energies", Review Scientific Instruments 44, 456 (1973) and "Use of Cylindrical Auger Spectrometers for Retarding-Potential Secondary-Electron Yield Measurements, Review Scientific Instruments 45, 861 (1974). FIG. 3 shows, as a function of the kinetic energy of an incident electron $E_{kin}$, the coefficient of secondary electron emission ε for a film of nitrocellulose (curve 31), after said film has been heated in a vacuum (curve 32) in FIG. 3 for approximately 30 minutes at a temperature of 380° C., and after electron bombardment (curve 33). This reveals that the coefficient of secondary electron emission changes both as a result of heating in a vacuum and as a result of electron bombardment. The coefficient of secondary emission exhibits a maximum, for these layers above 1, for a kinetic energy of approximately 200 eV. The film is so thin that the resistance is very high. The thickness of the film is preferably less than, for example, 1 μm, for example, in the range from 10 to 500 nm. Such layers generally adhere well to the surface. A so-called pre-coating is not required. The films can withstand spot-knocking.

A possible explanation for the effect obtained by the film is that field emission electrons can be emitted when a strong electric field occurs between the film and a field emitter which may be, for example, a sharp point on a part of the electron gun. These electrons have an average kinetic energy. The average kinetic energy of field emission electrons impinging on the film is approximately equal to the potential difference between the field emitter and the film. When the average kinetic energy is larger than the energy $E_{1f}$, which energy $E_{1f}$ is given by the energy value above which the coefficient of secondary emission is smaller than 1, the bulk of the electrons is captured in the film and electron-hopping cannot take place. This energy $E_{1f}$ is also termed "second crossover" (see, for example, "Handbook of Chemistry and Physics", 56th edition, CRC Press, p. E-366). The energy $E_{1f}$ for curves 31, 32 and 33 is less than 1 keV, i.e. approximately 900 eV, approximately 730 eV and approximately 420 eV, respectively. Partial decomposition of the film reduces the value of the second crossover ($E_{1f}$). An avalanche or hopping effect, in which an electron, after having been accelerated by an electric field, liberates more than one electron, each of which in turn liberate more than one electron etc., so that an ever increasing number of electrons move towards the highest potential, is then almost impossible. Electrons whose kinetic energy is less than $E_{1f}$ may give rise to an avalanche effect. In general, potential differences smaller than approximately 1 kV are insufficient to bring about field emission because the electric field strengths necessary for field emission are not attained. Consequently, the above negative effects are substantially reduced by the application of a film, for example a film of organic material, to insulating surfaces, which film exhibits a second crossover for an energy level smaller than 1 keV. It is assumed that, in general, such an avalanche effect does occur on a glass surface and contributes greatly to the above problems. In the case of glass, $E_{1f}$ is generally of the order of a few kV. At potential differences of a few kV field emission can take place.

It follows from the above that partial decomposition of the film, for example by heating or by an electron bombardment, has a positive effect. $E_{1f}$ generally decreases and this mitigates high-voltage problems. Organic films made of, for example, materials whose second crossover immediately after application is above 1 keV (examples are polyvinyl acrylate and acrylic resins for which $E_{1f}$ is approximately 2–2.5 keV) exhibit a distinctly improved high-voltage behaviour if they have been exposed to a high temperature (for example approximately 350° C.–400° C. for approximately 10–30 minutes) or to an electron bombardment. It is advantageous if the film is subjected to a partial decomposition treatment if the thickness of the layer is not more than 1 micron and, preferably, not more than 500 nm. As a matter of fact, apart from a positive effect (reduction of $E_{1f}$), decomposition also has a side-effect: the resistance of the layer decreases. If the sheet resistance becomes smaller than approximately $10^{10}$ $\Omega/\square$ the conduction via the film becomes such that the likelihood of high-voltage problems and, as a consequence, rejects increases. The likelihood of the resistance decreasing to such values during the decomposition process is comparatively great for layer thicknesses of more than 1 micron.

Preferably, films of organic polymers or derived therefrom are used. Information about polymers, their properties and processing methods are described in, inter alia, McGraw-Hill Encyclopedia of Science and Technology (1960) under "polymer" and related references. In general, polymers form a substantially smooth film of substantially uniform thickness on the surface. Preferably, the film is transparent. In this case, the electron gun can be inspected visually. Partly decomposed films generally have a grey or brown colour depending on the degree of decomposition but are preferably transparent. A particularly advantageous class of polymers are the water-soluble polymers, for example polyvinyl alcohols. Water is harmless to the environment.

FIGS. 4a and 4b show a further positive effect of an organic film provided on the inside of the neck. A problem which occurs in colour cathode ray tubes emitting more than one electron beam is the so-called convergence drift. After energizing the cathode ray tube, the relative positions of the electron beams on the display screen change. In FIGS. 4a and 4b the displacement of the outermost electron beams relative to the central electron beam of a 14 inch in-line colour cathode ray tube is plotted in micrometers (μ) as a function of time (t) in minutes. The time-dependent displacement of the relative positions of the electron beams will, for simplicity, hereinafter be referred to as "displacement". The displacement shown in curves 41 through 48 is related to the displacement after 100 minutes, which latter displacement is assumed to be 0 μ. Curves 41 through 46 show the displacement if no organic film is applied. The displacement is approximately 60 μ. Curves 47 and 48 show the displacement for a cathode ray tube in which the inside of the neck, more particularly the portion of the neck facing the main lens, and the multiform rod are coated with an organic layer, in this case a residue of a nitrocellulose layer. The average displacement is approximately 4 μ, which is a considerable and important improvement. This reduction in displacement enables a better preservation of the convergence of the electron beams on the screen. The displacement shown relates to a cathode ray tube having a so-called in-line electron gun. The invention can also be applied to cathode ray tubes having other types of electron guns for emitting more than one electron beam, for example so-called delta electron guns which, in operation, emit three electron beams located at the vertices of a triangle.

The invention is very important for, in particular, cathode ray tubes comprising an electron gun having a unipotential lens system. A unipotential lens system is a system for generating electric fields for focusing one or more electron beams, the electric potential, viewed in the direction of propagation of the electron beam or beams, varying from a high initial value via a low intermediate value to a high final value. In such electron guns, the above problems occur at a relatively low maximum voltage because, in operation, relatively high electric potentials and large potential differences occur in different places of the electron gun.

For an electron gun having a main lens at least one and preferably both lens electrodes of the main lens (the electrodes 26 and 27 in FIG. 2) are suitably formed by etching. Etching of the lens electrodes in conjunction with the film in accordance with the invention is found to have a highly positive effect on the high-voltage behaviour, and in particular the maximum voltage attainable before flashover occurs is found to have increased significantly.

Further, the invention is important for, in particular, cathode ray tubes comprising one or more electron guns having a conductive coating. Examples of such electron guns are so-called spiral-lens electron guns. Such electron guns comprise an element which is made from an electrically insulating material, for example a tubular element, on the inside of which a, for example spiral-shaped, conductive coating is provided. By applying a potential across said conductive layer, a focusing and/or accelerating electric field for focusing and/or accelerating an electron beam is created in the element. Cathode ray tubes comprising such electron guns are very sensitive to flashover which may damage the conductive layer, which in turn leads to damage to the lens. In such a cathode ray tube according to the invention, the neck and/or the outside of the element are coated with an organic film. Further examples of electron guns having a conductive layer are electron guns having a voltage divider composed of a conductive strip which is applied to a plate of insulating material. In operation, an electric voltage is applied across the conductive strip.

Further, the invention is important to optoelectronic cathode ray tubes such as, for example, image intensifiers and photomultipliers. An important factor in such cathode ray tubes is the so-called dark-count. The dark-count is the signal generated by the cathode ray tube in absolute darkness during operation. The above-described glimmers of light caused by electron transfer across surfaces are undesired because they increase the dark-count. Light signals producing a weaker signal than the dark-count in the optoelectronic cathode ray tube can not or hardly be measured. Thus, the dark-count is a measure of the optoelectronic sensitivity of such a tube.

It will be obvious that within the scope of the invention many variations are possible to those skilled in the art.

I claim:

1. A cathode ray tube comprising an electron gun, an electrically insulating surface in said cathode ray tube, and an electrically insulating film covering said electrically insulating surface, said electrically insulating film being a degradation product of a layer of an organic material.

2. A cathode ray tube according to claim 1, wherein said organic material is an element of the class including nitrocellulose, polyacrylates, acrylic resins, polyvinyl compounds such as polyvinyl acrylates, polyvinyl acetates and polyvinyl alcohols, fats and organic soaps.

3. A cathode ray tube according to claim 1, wherein said organic material is water soluble.

4. A cathode ray tube according to claim 1, wherein said electrically insulating film has a thickness of less than 1 micron.

5. A cathode ray tube according to claim 4, wherein said electrically insulating film has a thickness greater than 10 nm.

6. A cathode ray tube according to claim 1, wherein said electron gun is disposed in a neck of said cathode ray tube, said neck being of an insulating material, and wherein said electrically insulating film is provided on the inner side of said neck.

7. A cathode ray tube according to claim 6, wherein said electron gun includes a main lens having lens electrodes.

8. A cathode ray tube according to claim 1, wherein said electron gun includes elements of electrically insulating material, said elements being covered with said electrically insulating film.

9. A cathode ray tube according to claim 8, wherein said elements are fixing elements to which electrodes are secured.

10. A cathode ray tube according to claim 1, wherein said electrically insulating film has a sheet resistance of more than $10^{10}$ Ω/□.

11. A cathode ray tube comprising an electron gun, an electrically insulating surface in said cathode ray tube, and an electrically insulating film of an organic material covering said electrically insulating surface, said electrically insulating film being a thermal decomposition product of a layer of said organic material.

12. A cathode ray tube according to claim 11, wherein said organic material is an element of the class including nitrocellulose, polyacrylates, acrylic resins, polyvinyl compounds such as polyvinyl acrylates, polyvinyl acetates and polyvinyl alcohols, fats and organic soaps.

13. A cathode ray tube according to claim 11, wherein said organic material is water soluble.

14. A cathode ray tube according to claim 11, wherein said electrically insulating film has a thickness of less than 1 micron.

15. A cathode ray tube according to claim 14, wherein said electrically insulating film has a thickness greater than 10 nm.

16. A cathode ray tube according to claim 11, wherein said electron gun is disposed in a neck of said cathode ray tube, said neck being of an insulating material, and wherein said electrically insulating film is provided on the inner side of said neck.

17. A cathode ray tube according to claim 16, wherein said electron gun includes a main lens having lens electrodes.

18. A cathode ray tube according to claim 11, wherein said electron gun includes elements of electrically insulating material, said elements being covered with said electrically insulating film.

19. A cathode ray tube according to claim 18, wherein said elements are fixing elements to which electrodes are secured.

20. A cathode ray tube according to claim 11, wherein said electrically insulating film has a sheet resistance of more than $10^{10}$ Ω/□.

21. A cathode ray tube comprising an electron gun, an electrically insulating surface in said cathode ray tube, and an electrically insulating film covering said electrically insulating surface, said electrically insulating film being a partly carbonized layer of an organic material.

22. A cathode ray tube according to claim 21, wherein said electrically insulating film contains in atomic percentages approximately 50%±5% of carbon, approximately 15%±3% of oxygen, approximately 30%±3% of hydrogen, and approximately 3%±2% of nitrogen.

23. A cathode ray tube according to claim 21, wherein said electrically insulating film has a thickness of less than 1 micron.

24. A cathode ray tube according to claim 23, wherein said electrically insulating film has a thickness greater than 10 nm.

25. A cathode ray tube according to claim 21, wherein said electron gun is disposed in a neck of said cathode ray tube, said neck being of an insulating material, and wherein said electrically insulating film is provided on the inner side of said neck.

26. A cathode ray tube according to claim 25, wherein said electron gun includes a main lens having lens electrodes.

27. A cathode ray tube according to claim 21, wherein said electron gun includes elements of electrically insulating material, said elements being covered with said electrically insulating film.

28. A cathode ray tube according to claim 27, wherein said elements are fixing elements to which electrodes are secured.

29. A cathode ray tube according to claim 21, wherein said electrically insulating film has a sheet resistance of more than $10^{10}$ Ω/□.

30. A method of manufacturing a cathode ray tube comprising the steps of moistening an internal surface of an element of the cathode ray tube with a solution of an organic substance, drying said solution to form an organic layer, and at least partly decomposing said organic layer.

31. A method according to claim 30, wherein said step of partly decomposing is carried out by heating.

32. A method according to claim 30, wherein said step of partly decomposing is carried out by an election bombardment.

33. A method according to claim 30, wherein said solution is an aqueous solution.

* * * * *